Patented Oct. 26, 1926.

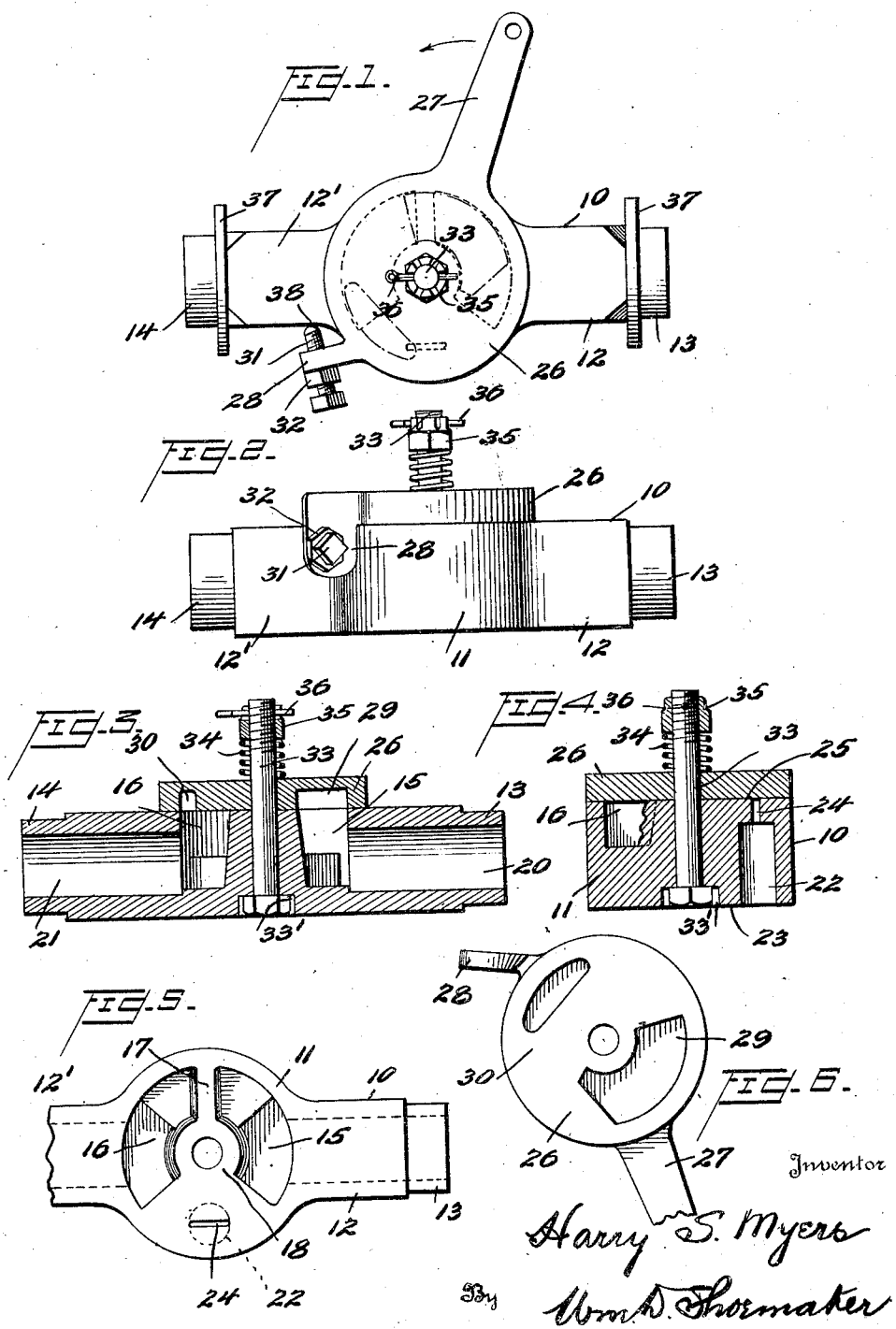

1,604,711

UNITED STATES PATENT OFFICE.

HARRY S. MYERS, OF VAN, PENNSYLVANIA.

PROPORTIONAL GAS-MIXING VALVE.

Application filed July 6, 1922. Serial No. 573,136.

This invention relates to a proportional gas mixing valve, and more particularly to such a valve designed for controlling the flow of two gases to a mixing chamber for the purpose of forming an explosive mixture.

The particular adaptation selected for the purpose of illustration is a valve designed with special reference to its insertion in the pipe line from an air purifying chamber to the mixing chamber of a power plant such as that of the Fordson tractor, a connection being provided in such a valve for the admission of natural gas. A valve of this kind adapts the Fordson tractor for use as a stationary power plant, consuming natural gas where that is obtainable.

The object of the invention is the improvement of the details of construction of such a proportional gas mixing valve whereby it is easily constructed and assembled, and whereby it will feed varying quantities of air and gas in the same proportion. Other objects of the invention will hereinafter appear in the following description and the novel features thereof will be particularly pointed out in the appended claims.

In the drawings,

Figure 1 represents a plan of my valve as it would appear upon the power plant of a Fordson tractor between the air washer and the vaporizer, Figure 2 is a side elevation of the same, Figure 3 is a vertical section, Figure 4 is a similar section taken at a right angle to that of Figure 3, Figure 5 is a plan, with the cover plate of the valve removed, and Figure 6 is a similar view of the removed cover plate.

Like reference characters indicate like parts throughout the several figures of the drawing. It will be understood that changes in the details of construction may be made without departing from the spirit of the invention, and that the form of the valve illustrated and described is indicative only of the principles of invention. Such form, however, has been found to be particularly efficient in construction and operation, and a number of such are now in use in Venango County, Pennsylvania.

The valve may be said to comprise two parts, a body which is shown as being cast in one piece, and a cover for the body, the two parts having movement relative to one another to vary the size of openings for the passage of air and gas. Suitable connecting means are provided as well as stop or limiting devices.

The body 10 comprises a central circular chamber 11, from which project the arms 12, 12' at the end of which are formed the machined connections 13 and 14. The body is adapted to be inserted in a power plant, such as is provided for the Fordson tractor. In that particular power plant, the connector 13 feeds into the air washer, while the connector 14 feeds into the mixing chamber, and the whole device replaces the short connecting pipe having the controlling valve therein.

The central chamber is formed with two compartments 15 and 16, separated by the partition 17, the bearing 18 and gas chamber 22. The air chamber 15 communicates with the connector 20, while the chamber 16 communicates with the connector 14. The gas chamber 22 is made by forming a bore from the under side 23 of the valve and a slitted conduit 24 is formed at the upper end of the gas chamber to the upper face 25 of the body of the valve. The cover is in the form of a disc 26 having a control arm 27, projecting from one side thereof and from the other a stop lug 28. In the cover are two recesses 29 and 30, the recess 29 being designed to permit communication between the chambers 15 and 16 of the body, whereby air may pass from the air washer to the mixing chamber of the power plant. The recess 30 is designed to admit gas from the chamber 22.

The lug 28 is projected downwardly out of the general plane of the cover, as shown in Figure 2, and is provided with a screw threaded aperture through which passes the threaded bolt 31, which is held in any selected or adjusted position on the lug by means of the lock nut 32.

It will be appreciated that the contacting faces of the body 11 and the cover 26 are properly machined so as to form a tight joint. In order to hold them in close contact, the body and cover are provided with aligned apertures at their centers through which is passed the clamping bolt 33, the head of which lies in the counterbore 34 in the under face of the body. Surrounding the threaded nut of the bolt 33 a spring 34 is mounted, and this spring is compressed any sufficient amount by the nut 35, which in turn is held against rotation upon the bolt, by means of the cotter pin, as is usual. It will be appreciated that this structure forms a means for varying the contacting pressure between the body and cover and that when the valve parts are placed in any particular position with respect to each other, this contact is made sufficient to hold them in that position.

The numerals 37, 37 indicate any suitable washers which may be employed to make air tight joints between the connectors 13 and 14 and the air washer and mixing chamber. From the foregoing description, the proposed operation of the valve should be apparent to one skilled in the art. A résumé thereof, however, will be given. In Figure 1, the valve is shown as closed, and the parts are in the position when air and gas are admitted to the mixing chamber in just sufficient quantity to cause the engine to run without load. At that time the bolt 31 is against the body of the valve, as shown at 38 in Figure 1. However, it will be appreciated that this adjustment can be changed so that the flow of fuel can be shut off completely, resulting in the stopping of the engine.

The valve cover is now rotated by exerting a pull upon the arm 27 in the direction of the arrow of Figure 1. This will cause the recess 30 to move over the face of the slotted opening 24 in the valve body, and at the same time will cause the recess 29 to move across the chamber 15. The progressively increasing passages produced by this movevment in both the gas and air intakes will be in correct proportion for the engine to obtain increased speed and power therefrom. The relative dimensions of the several recesses and intakes have been determined by experimentation under actual operating conditions as to gas pressure in the gas and oil fields, and are substantially those shown in the drawing. It will be appreciated that when these conditions are changed it will be necessary to slightly vary these relative sizes.

It will be seen that I have produced by this valve a convenient means for permitting the use of an engine of an ordinary tractor as a stationary power plant using natural gas as a fuel instead of liquid fuel. This use is particularly desirable in the gas and oil fields where natural gas has a certain percentage of products which are afterwards reduced to gasoline. It will be appreciated also that such a valve will largely increase the uses to which the ordinary tractor can be placed. In my shop at Van, Pa., I have in use at the present time a power plant comprising a tractor equipped with such a valve. This power plant is running a dozen pieces of machinery including a gear cutter and lathes; the fuel used is the natural gas produced on the farm upon which my shop is located.

Having described my invention, what I claim as new and desire to secure by Letters Patent is—

1. In a proportional gas mixing valve, a valve body comprising a block of metal recessed to provide separated air and gas intake chambers and an outlet for mixed air and gas, a disk member covering the recesses in said body and having recesses in one face thereof to provide passageways between the inlet chambers and the outlet in said body, and means for varying the quantity of mixed air and gas passing through said body by a movement of said cover.

2. In a proportional gas mixing valve, a body having gas and air intakes and a mixture conduit, a cover rotatably mounted upon said body and having recesses connecting said intakes and conduit, means for adjustably maintaining said body and cover in frictional contact, an arm projecting from said cover for rotating the same, and a limiting lug projecting from said cover and carrying an adjustable bolt adapted to contact with the body and define the closed position for said valve.

In testimony whereof I affix my signature.

HARRY S. MYERS.